United States Patent [19]

Alexander

[11] Patent Number: 5,156,550
[45] Date of Patent: Oct. 20, 1992

[54] BOTTOM MOUNTED AIR TRAP DEVICE

[75] Inventor: Robert B. Alexander, Schaumburg, Ill.

[73] Assignee: Haggerty Enterprises, Inc., Chicago, Ill.

[21] Appl. No.: 775,794

[22] Filed: Oct. 10, 1991

[51] Int. Cl.$^5$ .............................................. G09B 25/00
[52] U.S. Cl. ..................................... 434/370; 40/406; 446/267
[58] Field of Search ....................... 434/302, 370, 126; 446/267, 153; 40/406, 407; 60/398; D21/60

[56] References Cited

U.S. PATENT DOCUMENTS

| 3,613,264 | 10/1971 | Vitka et al. | 40/406 |
| 4,176,469 | 12/1979 | Timco | 434/126 |

Primary Examiner—John G. Weiss
Attorney, Agent, or Firm—Wallenstein, Wagner & Hattis, Ltd.

[57] ABSTRACT

An oscillating wave cell is disclosed. The oscillating wave cell comprises a substantially transparent, fluid vessel having a generally upper surface, a generally lower surface and transparent end caps. The wave cell contains first and second immiscible fluids of different colors, such as primarily a light mineral spirits and water. An air trap is provided which extends downwardly from the lower surface of the vessel. The air trap includes a partition defining a first trap chamber and a second trap chamber. The air trap further includes a plurality of passages extending between the vessel and the first trap chamber for permitting fluid flow therebetween. The partition extends downwardly from the lower vessel surface and includes a slot disposed away from the lower surface for permitting fluid flow between the first trap chamber and the second trap chamber. A base having an upwardly extending rocker mechanism including a cradle concealingly receives the air trap and supports the vessel.

22 Claims, 1 Drawing Sheet

BOTTOM MOUNTED AIR TRAP DEVICE

TECHNICAL FIELD

The invention relates to a wave cell in which plural, non-miscible liquids move in fluid motion in response to an applied rocking action, and more particularly, to such a wave cell having a concealed air trap.

BACKGROUND PRIOR ART

Oscillating wave cells in which two or more immiscible fluids of different colors are contained in an oscillating vessel to display fluid wave motion are well known. One such wave cell is disclosed in U.S. Pat. No. 3,613,264, to Vitka, et. al.

As disclosed in Vitka, the vessel is rectangular in shape and closed to the atmosphere. In addition to the two immiscible fluids, the vessel contains a small quantity of air to accommodate thermal expansion and contraction of the vessel and the liquids. In order to provide bubble-free display of the fluid motion, the wave cell includes an air trap located on one end of the vessel. An opaque end cover can be used to conceal the air trap. However, the end cap prevents full viewing of the fluid motion.

The present invention is provided to solve this and other problems.

SUMMARY OF THE INVENTION

It is an object of the invention to provide a completely transparent oscillating wave cell.

In accordance with the invention, the oscillating wave cell comprises a transparent vessel containing two immiscible fluids and having a generally upper surface and a generally lower surface. An air trap extends downwardly from the lower surface. The oscillating wave cell further includes a base having an upwardly extending rocker mechanism including a cradle. The cradle receives the air trap within the base so as to conceal the air trap, yet permit full viewing of the fluid motion.

It is contemplated that the vessel is cylindrical having transparent end caps. However, a wide variety of vessel shapes may be utilized.

It is further contemplated that the air trap includes a partition defining a first trap chamber and a second trap chamber. The wave cell includes means for permitting fluid flow between the vessel and the first trap chamber, and means disposed away from the lower surface for permitting fluid flow between the first trap chamber and the second trap chamber.

Other features and advantages of the invention will be apparent from the following specification taken in conjunction with the following drawings.

DETAILED DESCRIPTION

Figure 1:
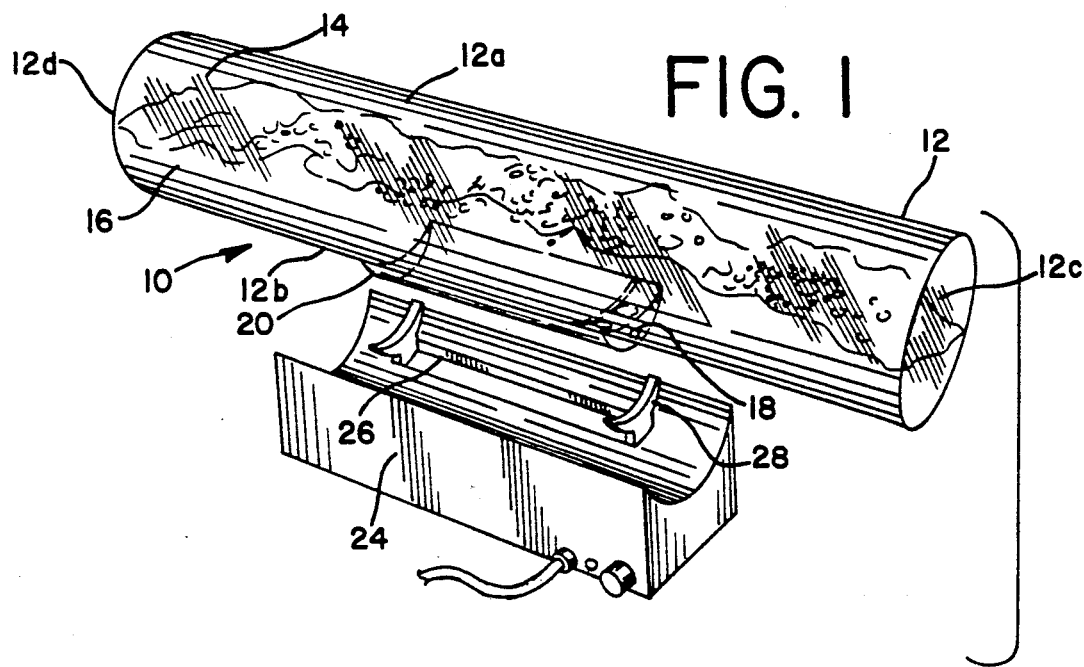
FIG. 1 is an exploded perspective view of an oscillating wave cell in accordance with the invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

An oscillating wave cell 10 is illustrated in FIG. 1. The oscillating wave cell 10 comprises a substantially transparent fluid vessel 12 having a generally upper surface 12a and a generally lower surface 12b, and clear end caps 12c and 12d. The vessel is cylindrical and is formed of an extruded acrylic to be seamless. The end caps 12c, 12d are sealingly attached to the vessel 12, such as by an acrylic cement.

The fluid vessel 12 contains two immiscible fluids 14, 16. The first fluid 14 is generally clear and comprises a mixture of odorless mineral spirits, such as Odorless 480 ®, distributed by Exxon Chemicals, and a flurocarbon, such as Freon TF ®, as distributed by DuPont Chemicals. The second fluid 16 is blue and comprises a mixture of water, alcohol and dye. The first fluid 14 is less dense than the second fluid 16, and thus floats on the second fluid 16. A low foaming nonionic surfactant, such as Merpol (previously known as Zonyl), distributed by DuPont Chemicals, is added to reduce the interfacial surface tension between the first and second liquids 14, 16 to enhance the fluid motion. A plug 17, such as a screw, is inserted into opening 18 to facilitate filling of the vessel 12.

As discussed above, a small amount of air 19 is provided in the vessel 12 to accommodate for thermal expansion and contraction of the first and second liquids 14, 16. In order to provide airbubble free fluid motion, an air trap 20 is provided which extends downwardly from the lower surface 12b. Unlike prior art wave cells wherein an air trap was placed on an end of the vessel, which interfered with complete viewing of the wave motion, the present air trap 20 extends downwardly from the vessel 12, to permit substantially 360 degree viewing of the wave motion. The air trap 20 is positioned slightly off-center to constantly load an oscillating motor (not shown).

A base 24 having an upwardly extending motorized rocker mechanism 26 including a cradle 28 supportingly receives the air trap 20 in a hollow of the base 24. The rocker mechanism 26 reciprocally rocks the vessel 12 to generate the fluid motion.

Figure 2:
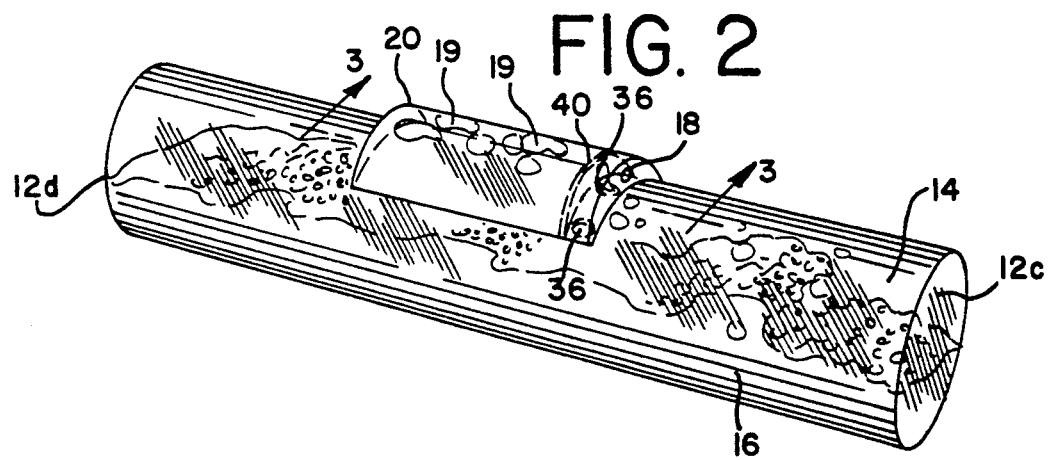
FIG. 2 is a more detailed view of an air trap utilized by the wave cell of FIG. 1.
Figure 3:
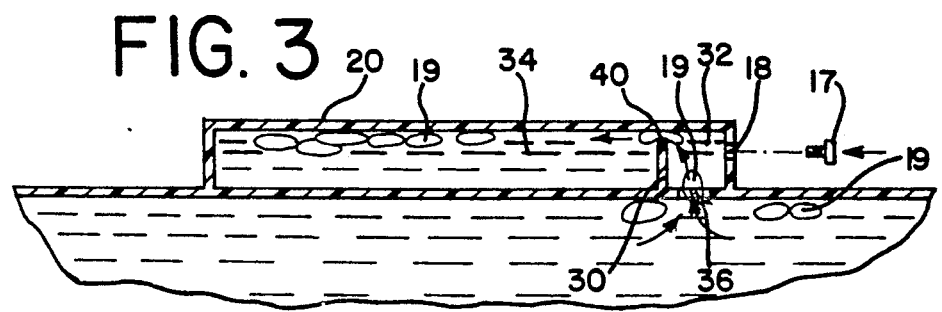
FIG. 3 is a cross section of the air trap taken along line 3—3 of FIG. 2.

The air trap 20 is shown in greater detail in FIGS. 2 and 3. The air trap 20 includes a partition 30 defining a first trap chamber 32 and a second trap chamber 34. To provide a path for the air from the vessel 12 to the air trap 20, means are provided for permitting fluid flow between the vessel 12 and the first trap chamber 32. Additionally, means disposed away from the lower surface 12b permit fluid flow between the first trap chamber 32 and the second trap chamber 34. Specifically, two passages 36 extend between the lower surface 12b and the first trap chamber 32.

Additionally, the partition 30 extends downwardly from the lower vessel surface 12b, but terminates before contacting the bottom surface of the air trap 20, forming a slot 40 for providing a fluid path between the first trap chamber 32 and the second trap chamber 34.

To move the air from the vessel 12 into the second trap chamber 34, one first directs the air trap 20 upwardly, and slowly rocks the vessel 12 so that air 19 in the vessel 12 enters the first trap chamber 32 via the passages 36. When the first trap chamber 32 is full of air, the vessel 12 is further rotated so that the second trap chamber 34 is higher than the first trap chamber 32, causing the air in the first trap chamber 32 to move to the second trap chamber 34 via the slot 40. These steps are repeated until all the air is removed from the vessel 12. At this time, the vessel 12 is rotated 180 degrees about its transverse axis, keeping the second trap chamber 34 higher than the passages 36 until the air trap 20 is positioned downward. This prevents the air from escaping into the vessel 12. The air trap 20 is then positioned in the cradle 28.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

I claim:

1. A wave cell adapted for mounting on an oscillating base, the wave cell comprising:
    a substantially transparent fluid vessel having, opposing ends, a generally upper surface and a generally lower surface said lower surface adapted for engaging said base, and said upper surface disposed opposite said lower surface; and
    an air trap disposed on said lower surface.

2. The wave cell of claim 1 wherein said chamber is cylindrical.

3. The wave cell of claim 1 wherein said chamber has substantially transparent end caps.

4. The wave cell of claim 1 wherein said vessel contains first and second immiscible fluids.

5. The wave cell of claim 4 wherein said first and second immiscible fluids are of different colors.

6. The wave cell of claim 4 wherein said first immiscible fluid is principally a light mineral spirits and said second immiscible fluid is principally water.

7. A wave cell adapted for mounting on an oscillating base, the wave cell comprising:
    a substantially transparent fluid vessel having a generally upper surface and a generally lower surface; and
    an air trap disposed on said lower surface, wherein said air trap includes a partition defining a first trap chamber and a second trap chamber, said wave cell including means for permitting fluid flow between said vessel and said first trap chamber, and means disposed away from said lower surface for permitting fluid flow between said first trap chamber and said second trap chamber.

8. The wave cell of claim 7 wherein said means for permitting fluid flow between said vessel and said first trap chamber comprises a plurality of passages.

9. The wave cell of claim 7 wherein:
    said partition extends downwardly from said lower vessel surface; and
    said means disposed away from said lower surface for permitting fluid flow between said first trap chamber and said second trap chamber comprises a slot in said partition disposed away from said lower surface.

10. An oscillating wave cell comprising:
    a base;
    a wave cell including a substantially transparent fluid vessel having opposing ends, a generally upper surface and a generally lower surface, said lower surface adapted for engaging said base, and said upper surface disposed opposite said lower surface and an air trap extending downwardly from said lower surface;
    wherein said base has an upwardly extending rocker mechanism including a cradle for receiving said air trap.

11. The oscillating wave cell of claim 10 wherein said air trap is concealed in said base.

12. The oscillating wave cell of claim 10 wherein said vessel is cylindrical.

13. The oscillating wave cell of claim 10 wherein said chamber has substantially transparent end caps.

14. The wave cell of claim 10 wherein said vessel contains first and second immiscible fluids.

15. The wave cell of claim 14 wherein said first and second immiscible fluids are of different colors.

16. The wave cell of claim 14 wherein said first immiscible fluid is principally a light mineral spirits and said second immiscible fluid is principally water.

17. An oscillating wave cell comprising:
    a wave cell including a substantially transparent fluid vessel having a generally upper surface and a generally lower surface and an air trap extending downwardly from said lower surface;
    a base having an upwardly extending rocker mechanism including a cradle for receiving said air trap, wherein said air trap includes a partition defining a first trap chamber and a second trap chamber, said wave cell including means for permitting fluid flow between said vessel and said first trap chamber, and means disposed away from said lower surface for permitting fluid flow between said first trap chamber and said second trap chamber.

18. The wave cell of claim 17 wherein said means for permitting fluid flow between said vessel and said first trap chamber comprises a plurality of passages.

19. The wave cell of claim 17 wherein:
    said partition extends downwardly from said lower vessel surface; and
    said means disposed away from said lower surface for permitting fluid flow between said first trap chamber and said second trap chamber comprises a slot in said partition disposed away from said lower surface.

20. An oscillating wave cell comprising:
    a base;
    a substantially transparent fluid vessel having opposing ends, a generally upper surface and a generally lower surface, said lower surface adapted for engaging said base, and said upper surface disposed opposite said lower surface, said wave cell containing first and second immiscible fluids;
    an air trap extending downwardly from said lower surface, said air trap including a partition defining a first trap chamber and a second trap chamber, said air trap further including a plurality of passages extending between said vessel and said first trap chamber for permitting fluid flow therebetween, and said partition extends downwardly from said lower vessel surface and includes a slot disposed away from said lower surface for permitting fluid flow between said first trap chamber and said second trap chamber; and
    wherein said base has an upwardly extending rocker mechanism including a cradle for concealing receiving said air trap.

21. The oscillating wave cell of claim 20 wherein said vessel is cylindrical having substantially transparent end caps.

22. The wave cell of claim 20 wherein said first and second immiscible fluids are of different colors.

* * * * *